United States Patent
Walter et al.

(10) Patent No.: US 9,561,546 B1
(45) Date of Patent: Feb. 7, 2017

(54) DRILL ATTACHMENT

(71) Applicant: Clam Corporation, Medina, MN (US)

(72) Inventors: Thomas A. Walter, Cologne, MN (US); Steven Uscensky, St. Louis Park, MN (US)

(73) Assignee: Clam Corporation, Rogers, MN (US)

( * ) Notice: Subject to any disclaimer, the term of this patent is extended or adjusted under 35 U.S.C. 154(b) by 898 days.

(21) Appl. No.: 13/894,911

(22) Filed: May 15, 2013

(51) Int. Cl.
*B23B 45/00* (2006.01)
*B23B 39/00* (2006.01)

(52) U.S. Cl.
CPC .................................... *B23B 39/00* (2013.01)

(58) Field of Classification Search
CPC ................ B25F 5/021; Y10T 408/5647; Y10T 408/6786; Y10T 408/65; E21B 11/005; E21B 41/00; E21B 7/005
USPC ....... 175/18, 394; 408/238, 239 A; 173/1–2, 173/213, 170–171
See application file for complete search history.

(56) References Cited

U.S. PATENT DOCUMENTS

| | | | |
|---|---|---|---|
| 1,575,146 A | 3/1926 | Brown | |
| 2,405,110 A * | 8/1946 | Bullock | B25H 1/0035 173/141 |
| 2,947,204 A * | 8/1960 | Pine | B25H 1/0035 173/141 |
| 2,975,848 A * | 3/1961 | Roberts | E21B 3/02 173/170 |
| 3,032,126 A * | 5/1962 | Rexine | E21B 3/02 173/170 |
| 3,705,632 A * | 12/1972 | Burke | E21B 11/005 173/27 |
| 3,949,817 A * | 4/1976 | Rice | A01G 3/08 16/427 |
| 3,985,188 A * | 10/1976 | Steele | B25C 7/00 173/170 |
| 4,284,373 A * | 8/1981 | Wolff | B25H 1/0042 408/129 |
| 4,317,282 A * | 3/1982 | Pace | A01D 34/412 173/170 |
| 4,511,004 A | 4/1985 | Deneen | |
| 4,582,456 A * | 4/1986 | Imai | B25H 1/0042 408/136 |

(Continued)

OTHER PUBLICATIONS

Bass Pro Shop, "Eskimo® Shark Z71 Quantum 10" Power Ice Auger," BPS Direct, LLC., 3 pages, 2013. http://www.basspro.com/Eskimo-Shark-Z71-Quantum-10-Power-Ice-Auger/product/10229324/?cmCat=CROSSSELL_PRODUCT.

(Continued)

*Primary Examiner* — Robert Long

(57) ABSTRACT

A drill assembly attachment having a handle, a drill mount, and a throttle. The throttle may have a first portion and a second portion rotationally engaged with the first portion such that the second portion is rotationally actuated in response to linear actuation of the first portion of the throttle. The throttle is positioned with respect to the drill mount and the handle such that the first portion may be linearly actuated by a user with a hand grasping the handle. The drill assembly attachment receives a drill assembly such that the throttle adjustably engages a trigger of the drill assembly. The drill assembly attachment or the drill assembly receives an auger or other tool and the drill assembly attachment with the drill assembly and auger or other tool is used in a method of rotating the auger or other tool.

16 Claims, 12 Drawing Sheets

(56) References Cited

U.S. PATENT DOCUMENTS

| | | | | |
|---|---|---|---|---|
| 4,736,804 A * | 4/1988 | Geibel | B25H 1/0035 173/30 |
| 5,322,397 A * | 6/1994 | Spear | B25H 1/0035 173/36 |
| 5,361,851 A * | 11/1994 | Fox | B25F 5/021 173/170 |
| 5,598,892 A * | 2/1997 | Fox | B25F 5/021 173/170 |
| 5,598,893 A * | 2/1997 | Carlson | E04H 17/263 173/216 |
| 6,021,854 A * | 2/2000 | Scarola | B25F 5/021 173/141 |
| 6,076,617 A | 6/2000 | Berner | |
| 6,125,951 A | 10/2000 | Bowser | |
| 6,311,785 B1 * | 11/2001 | Paterson | B23B 51/02 173/1 |
| 6,315,059 B1 * | 11/2001 | Geldean | E21B 7/028 173/112 |
| 6,598,775 B1 * | 7/2003 | Chen | B25C 7/00 227/113 |
| 6,626,250 B1 | 9/2003 | Ham | |
| 6,755,597 B2 * | 6/2004 | Bergner | B23Q 7/10 144/136.95 |
| 7,140,456 B2 | 11/2006 | Maki | |
| 7,226,058 B2 | 6/2007 | Bouchard | |
| 7,228,917 B2 * | 6/2007 | Davis | B25C 7/00 16/114.1 |
| 7,237,707 B1 * | 7/2007 | Wakelin | B25C 7/00 173/170 |
| 7,503,732 B2 * | 3/2009 | Byrd | B25H 1/0078 408/115 R |
| 7,513,404 B2 * | 4/2009 | Shkolnikov | B25C 1/008 227/130 |
| 7,617,885 B2 * | 11/2009 | Howland | B25F 5/00 173/1 |
| 7,874,303 B2 | 1/2011 | Xie | |
| 7,900,420 B2 * | 3/2011 | Pope | E04F 21/165 173/13 |
| 8,074,348 B2 * | 12/2011 | Haytayan | B25B 21/002 29/432 |
| 8,162,074 B2 * | 4/2012 | Cook | B23B 45/001 16/114.1 |
| 2004/0191016 A1 * | 9/2004 | Hintze | B23B 49/008 408/67 |
| 2004/0240954 A1 | 12/2004 | Chilcott | |
| 2005/0000736 A1 | 1/2005 | Maki | |
| 2005/0205298 A1 | 9/2005 | Kollasch et al. | |
| 2006/0011358 A1 | 1/2006 | Motosko | |
| 2006/0062632 A1 | 3/2006 | Jang | |
| 2006/0169492 A1 | 8/2006 | Kowalewski | |
| 2006/0254818 A1 | 11/2006 | Pepple | |
| 2009/0084567 A1 * | 4/2009 | Basham | B25C 7/00 173/29 |
| 2010/0019014 A1 * | 1/2010 | Rodenhouse | B25B 21/002 227/32 |
| 2010/0074702 A1 | 3/2010 | Kluge | |
| 2011/0100652 A1 | 5/2011 | Motosko | |
| 2011/0266015 A1 * | 11/2011 | Ohlendorf | B23Q 11/0046 173/198 |
| 2012/0255749 A1 * | 10/2012 | Seith | B25B 13/06 173/1 |
| 2012/0318577 A1 | 12/2012 | Ruppel et al. | |
| 2013/0020105 A1 * | 1/2013 | Cook | B25F 5/026 173/170 |
| 2013/0112447 A1 * | 5/2013 | Rohrer, Jr. | E04H 17/26 173/90 |
| 2014/0174824 A1 | 6/2014 | Schamberger et al. | |
| 2015/0343617 A1 * | 12/2015 | Kondo | B25B 21/02 173/93 |

OTHER PUBLICATIONS

Bass Pro Shop, "Jiffy® STX™ Pro II Power Ice Auger," BPS Direct, LLC., 3 pages, 2013. http://www.basspro.com/Jiffy-STX-Pro-II-Power-Ice-Auger/product/10210593/?cmCat=CROSSSELL_PRODUCT.

Bass Pro Shop, "StrikeMaster® Magnum™ Power Ice Augers—MP 825 and MP 1025," BPS Direct, LLC., 3 pages, 2013. http://www.basspro.com/StrikeMaster-Magnum-Power-Ice-Augers-MP-825-and-MP-1025/product/99272/?cmCat=CROSSSELL_PRODUCT.

FishUSA Inc., "Ice Master Ice Auger/Power Drill Conversion Kits," 2 pages, Printed Sep. 3, 2013. http://www.fishusa.com/Product/Ice-Master-Ice-Auger-Power-Drill-Conversion-Kit.

Hhogenerators, "Eskimo Ice Auger Adapter for Cordless Drill Ice Fishing," Ebay, 3 pages, printed Sep. 3, 2013. http://www.ebay.com/itm/Eskimo-Ice-Auger-Adapter-Cordless-Drill-Ice-Fishing-/180595711892#ht_714wt_1142.

The Sportsman's Guide, Inc., "Cut Ice Fishing Holes Effortlessly with the Nimrod Ice Auger Adapter and Smart Handle," 2 pages, printed Sep. 3, 2013. http://www.sportsmansguide.com/net/cb/nimrod-ice-auger-adapter.aspx?a=235370.

Vexilarinc, "Electric Drill Ice Augers," Vexilar Inc., video, printout 3 pages, posted Dec. 11, 2009. http://www.youtube.com/watch?v=3IUxUEE778w.

* cited by examiner

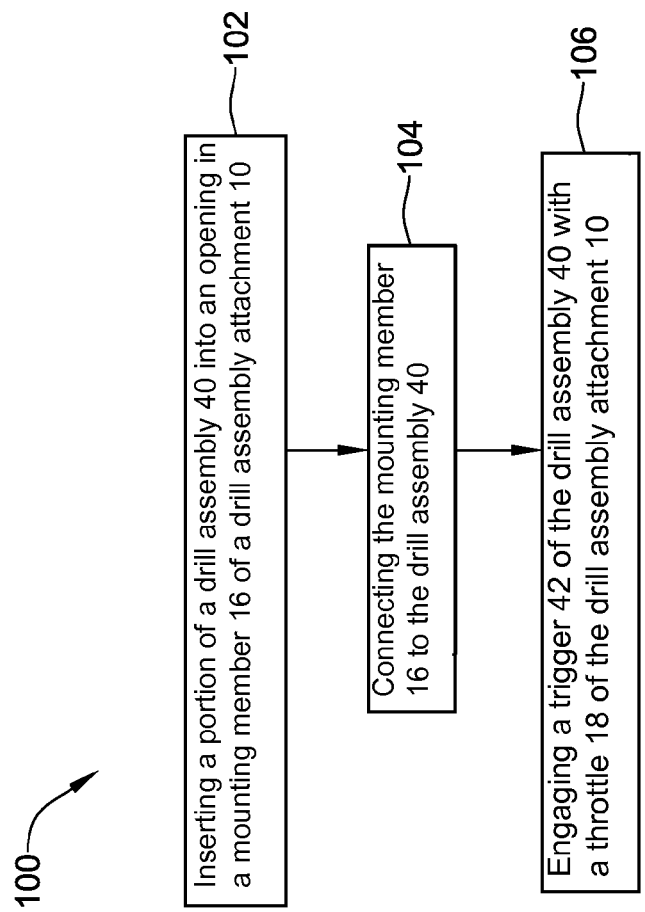

DRILL ATTACHMENT

TECHNICAL FIELD

This disclosure is directed to drill attachments and more particularly, this disclosure is directed to power drill attachments for operating a power drill.

BACKGROUND

Auger assemblies are used to transport and convey materials, including, but not limited to particulate materials, grains, fibers, dirt, water, snow, and ice particles to desired locations. Conventional auger assemblies typically have elongated shafts with continuous helical flights fixed to the shafts. In some cases, auger assemblies may be manually rotated and in other cases, auger assemblies may have a power transmission or may otherwise be operated with a motor.

SUMMARY

This disclosure is directed to several alternative or complementary designs of, materials of, and methods of using drill attachments for operating a drill when the drill is connected to an auger or other device.

Accordingly, one illustrative instance of the disclosure may include a drill assembly attachment including a handle, a drill mount connected to the handle, and a throttle connected to the drill mount and/or the handle. The drill mount may be capable of receiving a drill assembly such that the throttle interacts with a trigger of the drill assembly. In one instance, the drill assembly attachment may include a chuck, where the chuck may be received in an opening in the drill mount and may be connectable to one or more of an auger or other device (e.g., a digger, a mixing tool, or other rotating device) and the drill assembly.

In some instances, this disclosure includes a drill mount assembly configured to receive a drill assembly, where the drill mount assembly may include a mounting member, a handle, and throttle. The mounting member may have a first portion and a second portion, the handle may extend from the mounting member, and the throttle may be in adjustable communication with one or more of the mounting member and the handle. The throttle may have a user engaging portion and a trigger engaging portion in rotational communication with the user engaging portion. In some cases, when the user engaging portion is linearly adjusted or actuated, the trigger engaging portion may be rotationally adjusted or actuated in response to the linear movement of the user engaging portion.

In some instances, the drill mount assembly of this disclosure may be used in a method. The method may include inserting a first portion of a drill into an opening of a first portion of a mounting member of a drill mount assembly and connecting a second portion of the drill to a second portion of the mounting member, where a trigger of the drill may be engaged with an adjustable throttle of the drill mount assembly. In some cases, a user may grasp a first portion of a handle of the drill mount assembly and grasp a second portion of the handle while grasping the first portion of the handle. While grasping the handle or at any other time and/or position, a first portion of the adjustable throttle may be linearly adjusted by the user to rotate a second portion of the adjustable throttle and engage the trigger of the drill.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 12 is a schematic flow chart of an illustrative method of using a power drill attachment.

Figure 1:
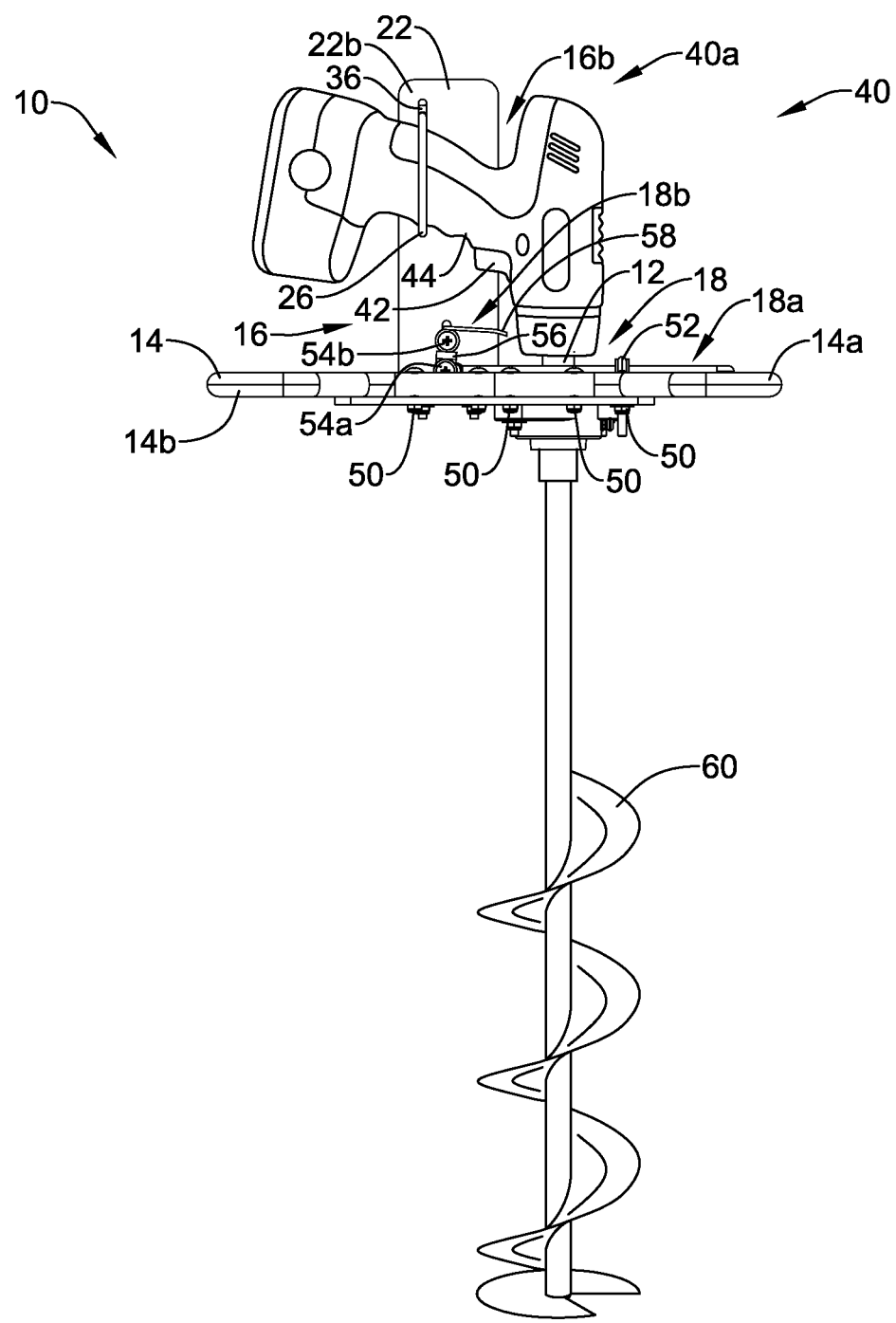
FIG. 1 is a schematic side view of an illustrative power drill attachment, an illustrative power drill, and an illustrative rotatable device.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

Generally, as described herein and depicted in FIGS. 1-8, a drill assembly attachment 10 may be a tool and/or one or more attachment pieces that may be used with a power drill (e.g., a hand-held corded or cordless power drill or other power drill) or other drill mechanism. In some instances, the drill assembly attachment 10 may have a chuck 12 (alternatively, the chuck 12 may be separate from the drill assembly attachment 10) that is able to and/or is configured to connect an auger 60 or other rotatable device (e.g., a mixer, other rotatable digger, etc.) with a power drill assembly 40. The chuck 12 may be configured to rotate within the drill assembly attachment 10, but may otherwise be substantially adjustably fixed (e.g., axially fixed) within and/or with respect to the drill assembly attachment 10, as further described below. The auger 60 or other rotatable device may be any typical auger of any typical size and shape that is capable of attaching to at least one of the chuck 12, the drill assembly attachment 10, the drill assembly 40, or other feature.

As shown in FIGS. 1-10, the drill assembly attachment 10 may include a handle 14, a mounting member or a drill mount 16 connected to the handle 14, and a throttle 18 connected to the drill mount 16. In some instances, the mounting member or drill mount 16 may receive a drill assembly 40 and may engage the drill assembly 40 in a position with respect to the handle 14 and/or the throttle 18. Alternatively, or in addition, the drill mount 16 may be capable of receiving the drill assembly 40 such that the throttle 18 may adjustably interact with a trigger 42 of the drill assembly 40.

Illustratively, the mounting member or drill mount 16 of the drill assembly attachment 10 may have a first portion 16a and a second portion 16b. In some instances, the mounting member or drill mount 16 may include one or more of a base plate 20 connected to or otherwise extending from the handle 14, a side plate 22 connected to and/or extending from the base plate 20, one or more brackets 26, one or more bracket connectors 28, a bearing assembly 30, and any other feature, as desired. In some instances, the second portion 16b of the mounting member or drill mount 16 may include the side plate 22 of the drill mount 16 and the side plate 22 may be positioned on or about (e.g., extending from, connected to, etc.) the first portion 16a including the base plate 20. The first portion 16a and the second portion 16b of the mounting member or drill mount 16 may be oriented such that a handle 44 of a drill assembly 40 received in the drill assembly attachment 10 may be positioned adjacent the side plate 22, as shown in FIG. 1.

The handle mounting member or drill mount 16 may be made from any material in any manner, as desired. For example, the mounting member or drill mount 16 may be made from a metal, a polymer, a composite material, or other material at least capable of structurally withstanding forces from a user and/or a drill assembly 40 while the user operates the drill assembly 40 with the drill assembly attachment 10 connected to the drill assembly 40.

Figure 2:
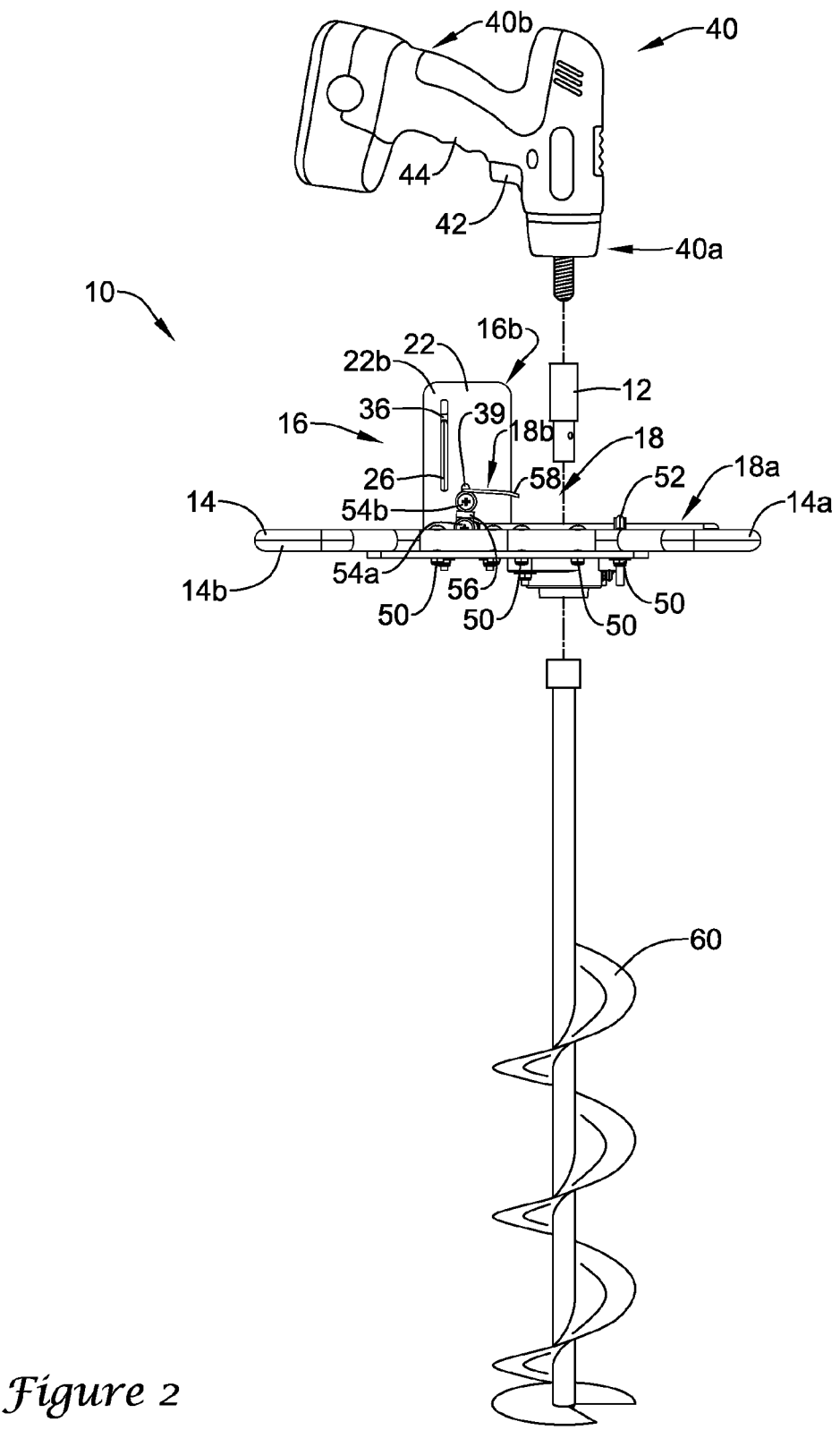
FIG. 2 is a schematic partially exploded side view of the illustrative power drill attachment, the illustrative power drill, and the illustrative rotatable device depicted in FIG. 1.

A chuck 12 that may be connected to (e.g., via a threaded engagement, pin-lock, or other connection type) the drill assembly 40 received in the drill assembly attachment 10 may be received in and/or through an opening 32 in the base plate 20, as shown in FIGS. 1 and 2. In some instances, the chuck 12 and/or the drill assembly 40 may abut a ledge 32' of the base plate 20 or a ledge of the bearing assembly 30 forming or adjacent to the opening 32 to ensure the chuck 12 cannot freely pass through the opening 32. Alternatively, or in addition, one or more set screws 38 or other connectors may engage the chuck 12 to axially fix the chuck 12 within the opening 32 of the base plate 20.

As shown in the Figures, the side plate 22 and base plate 20 may include two separate features that are connected by adjustable features (e.g., adjustable threaded members, nuts and/or bolts, other adjustable members configured to mate, etc.). Even so, it is contemplated that the side plate 22 and base plate 20 may be connected with other connection means, may be connected in a non-adjustable manner, may be connected in a permanent manner (e.g., the side plate 22 may be connected to the base plate 20 with a weld connection or other similar connection, such that the side plate 22 may not be separable from the base plate 20 without mechanically or otherwise altering one or both of the base plate 20 and the side plate 22), and/or may be unitarily constructed (e.g., with a molding process, a mechanical bending process and/or any other desirable manufacturing process).

Figure 3:
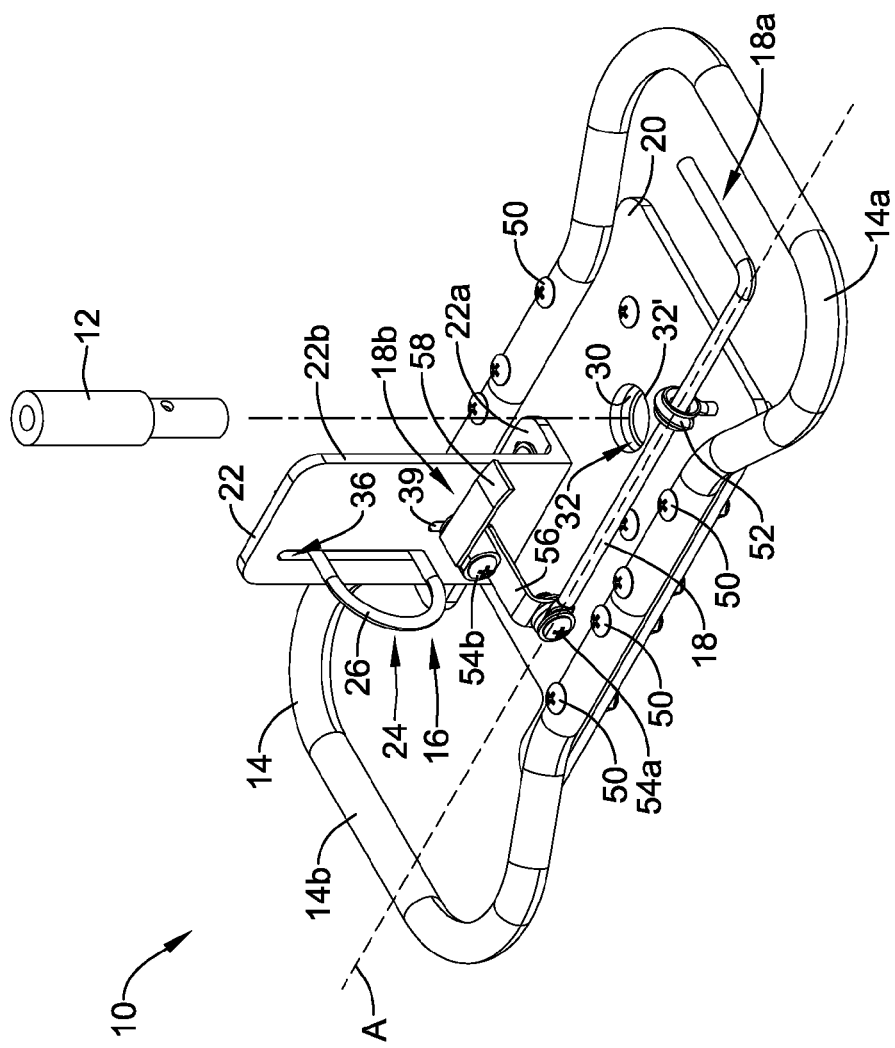
FIG. 3 is a schematic perspective view from above of an illustrative power drill attachment.
Figure 5:
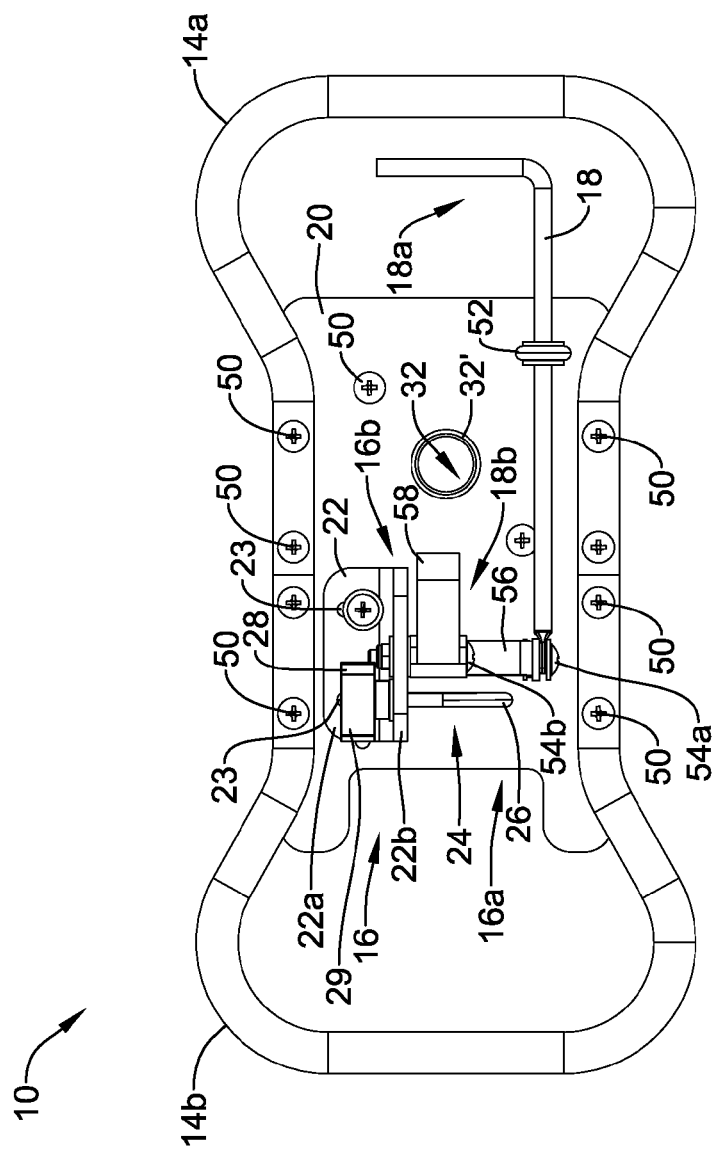
FIG. 5 is a schematic top view of an illustrative power drill attachment.

In one example, where the side plate 22 and the base plate 20 may be separate features, the side plate 22 may have an "L" shape, as shown in FIGS. 3 and 5. The L-shaped side plate 22 may have a first part 22a that may be positioned to adjustably abut and/or connect to the base plate 20 and a second part 22b extending from the first part 22a. The second part 22b of the side plate 22 may extend from the first part 22a at any angle. For example, the second part 22b may extend at substantially ninety (90) degrees from the first part 22a of the side plate 22.

Illustratively, the first part 22a of the side plate 22 may be connected to the base plate 20 in any manner. For example, assembly connectors 50 may connect the first part 22a to the base plate 20 by extending through an opening 23 in the first part 22a and through an opening 21 in the base plate 20. The openings 21 in the base plate 20 and the openings 23 in the first part 22a of the side plate 22 may be elongated (e.g., the openings 23 in the first part 22a of the side plate 22 may be elongated in a direction substantially perpendicular to the elongated direction of the openings 21 in the base plate 20) or may have a different shape to allow the position of the first part 22a of the side plate 22 to be adjusted with respect to the base plate 20, as desired. Alternatively, or in addition, the first part 22a of the side plate 22 may be connected to the base plate 20 in a fixed manner and/or permanent manner. Alternatively, or in addition, any type of connector or connection technique may be used to effect a connection between the side plate 22 and the base plate 20.

Figure 11:
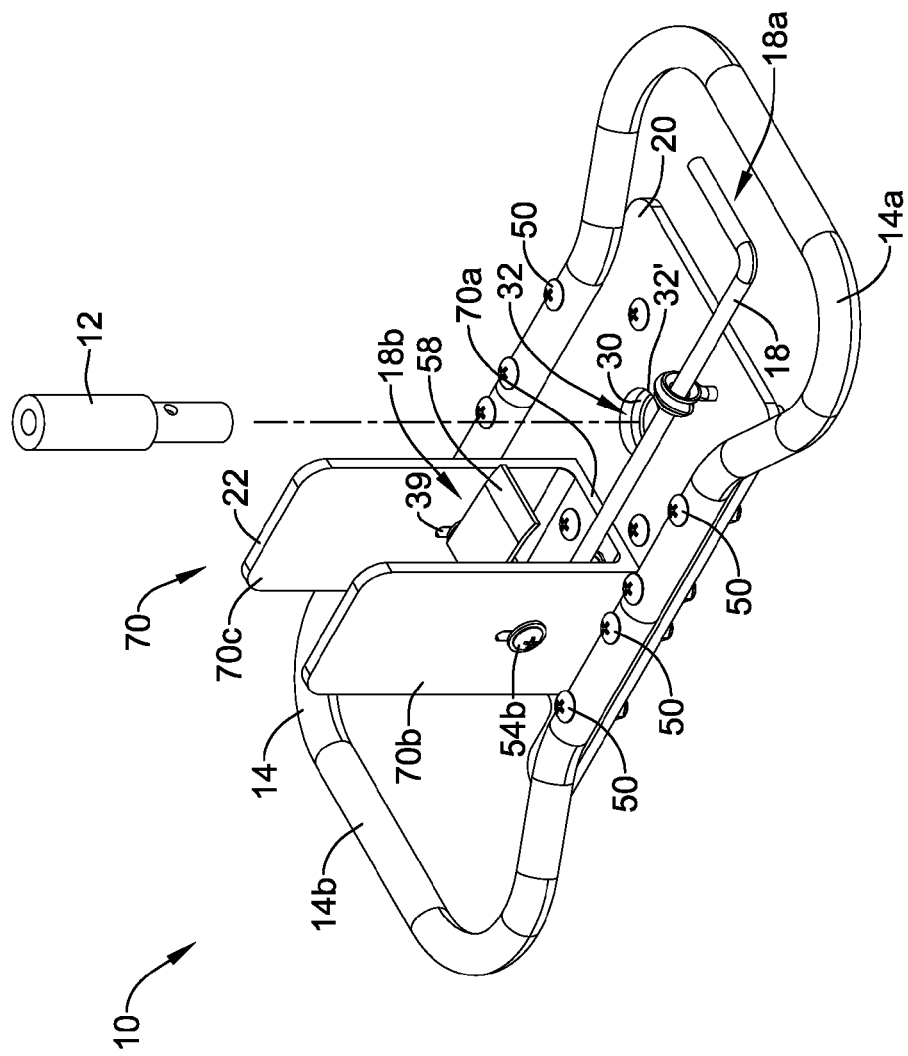
FIG. 11 is a schematic perspective view from above of an illustrative power drill attachment.

The side plate 22 may take on any other shape (e.g., any shape in addition to or other than an L-shape) configured to engage and/or abut the handle 44 of the drill assembly 40 when the drill assembly 40 is received in the drill assembly attachment 10. In some instances, the side plate 22 may take on a cradle 70 configuration, as depicted in FIG. 11. The cradle 70 may have a first part 70a, a second part 70b, and a third part 70c, where the second part 70b and the third part 70c extend from the first part 70a and are separated such that the handle 44 of the drill assembly 40 may be received between the second part 70b and the third part 70c of the cradle 70. Illustratively, the second part 70b and the third part 70c may be arranged such that they receive the handle 44 of the drill assembly 40 therebetween and prevent or at least substantially prevent rotational movement of the handle 44 of the drill assembly 40 in both rotational directions (e.g., clockwise and counter-clockwise) when the drill assembly 40 is positioned within the drill assembly attachment 10. Alternatively, or in addition, the cradle 70 may be formed from two side plates 22 facing each other or other members, such that the handle 44 of a received drill assembly 40 may be prevented or at least substantially prevented from moving in rotational directions.

Figure 6:
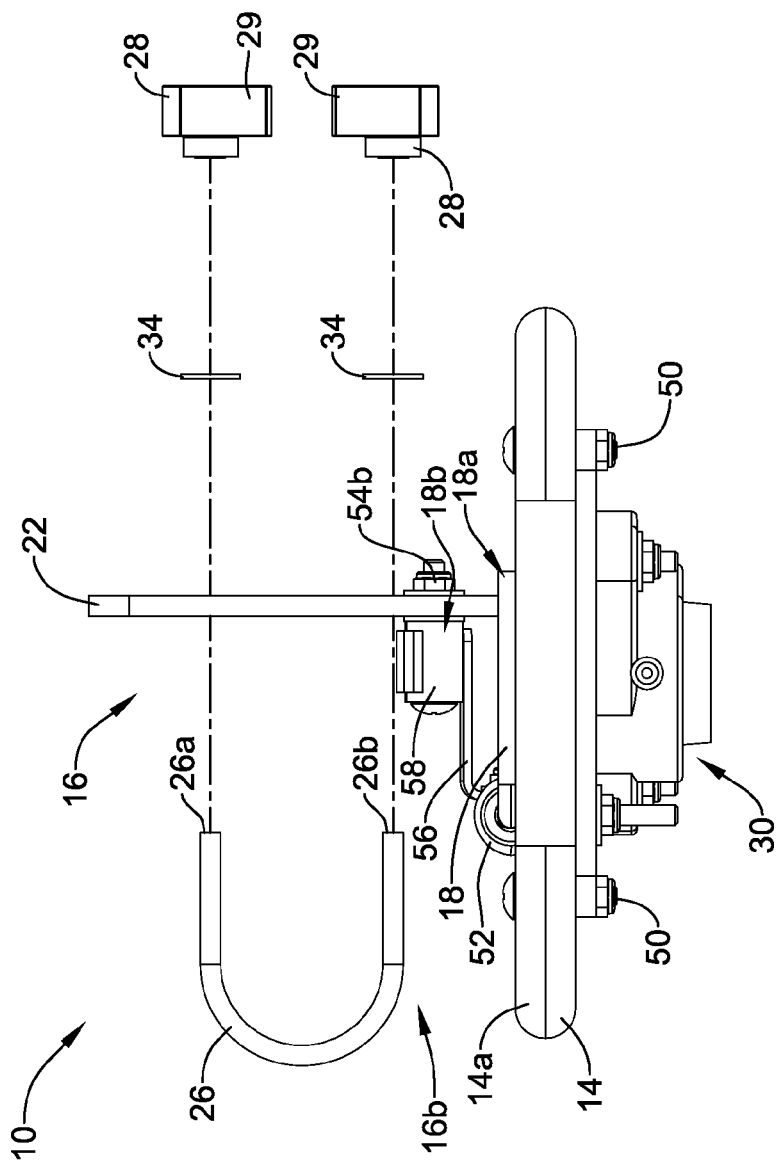
FIG. 6 is a schematic partially exploded end view of an illustrative power drill attachment.

In some instances, the mounting member or drill mount 16 may include a handle receiving assembly or handle connector 24 that may engage a handle 44 of the drill assembly 40 when the drill assembly 40 is received in the drill assembly attachment 10. For example, as shown in FIGS. 3, 5 and 6, the handle connector 24 may include the side plate 22, one or more connectors or brackets 26 (e.g., a C-bracket, a U-bracket, or any other type of bracket or other feature capable of receiving a handle of a drill assembly), one or more bracket connectors 28, one or more washers 34, and/or one or more other features, as desired. The handle receiving assembly or handle connector 24 may be capable of and/or configured to prevent or at least substantially prevent the handle 44 of a received drill assembly 40 from moving in rotational directions.

Figure 7:
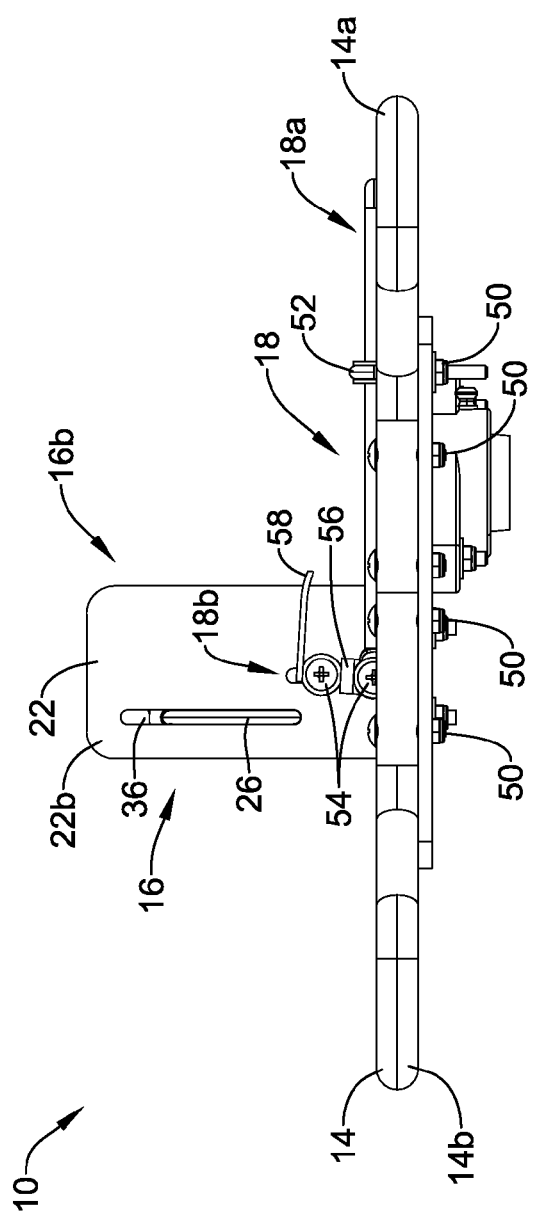
FIG. 7 is a schematic side view of an illustrative power drill attachment.
Figure 8:
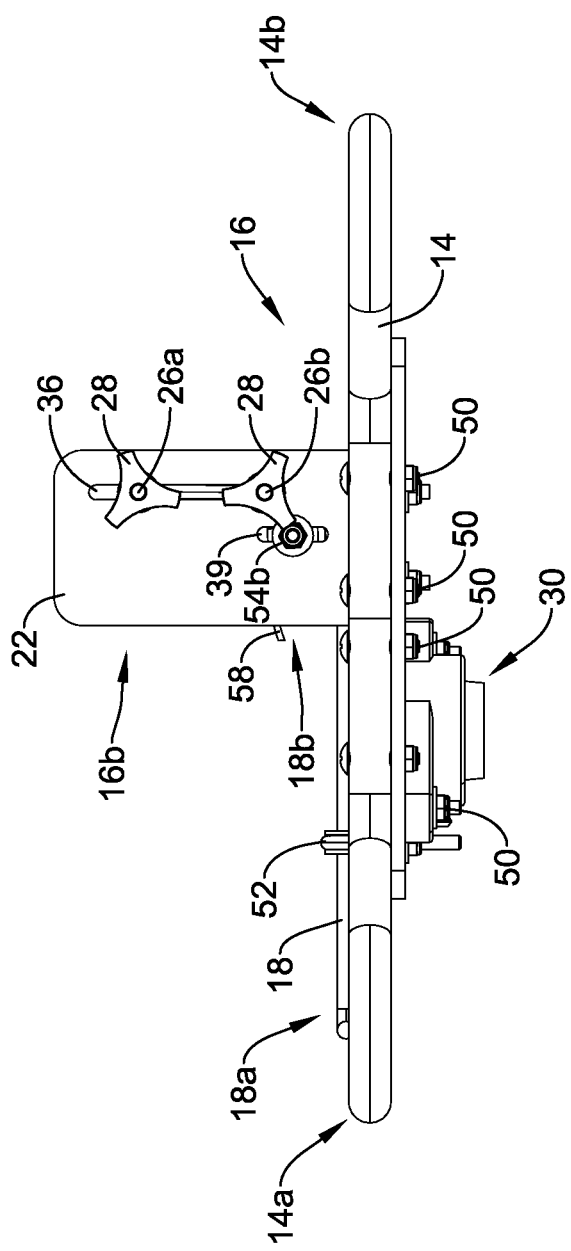
FIG. 8 is a schematic side view of an illustrative power drill attachment.

Second portion 16b (e.g., the side plate 22) of the mounting member or drill mount 16 may be configured to receive the bracket 26 of the handle connector 24 in one or more openings 36. As shown in FIGS. 3, 7, and 8, an opening 36 in the side plate 22 may be elongated such that it has a length greater than a distance between a first end 26a and a second end 26b of the bracket 26 to allow a distance from the base plate 20 to the bracket 26 to be adjusted. Additionally, or alternatively, the opening 36 in the side plate 22 may be sized to substantially prevent movement of the bracket 26 in a direction substantially angled from a direction of movement of the bracket 26 in a lengthwise or elongated direction of the elongated opening 36. Although the opening 36 in the side plate 22 is shown in the Figures as a single opening 36, the opening 36 may comprise a plurality of openings having substantially the same shapes and/or sizes, or one or more of the plurality of openings having a shape and/or size different than a shape and/or size of at least one other of the plurality of openings. The multiple openings or various shapes of openings may facilitate adjustment of the bracket 26 within the side plate 22 and/or may be provided, if at all, for other purposes.

In some instances, the bracket 26 may be secured to the side plate 22 with one or more bracket connectors 28 (e.g., a nut, a threaded member, or other member configured to connect to one or more of the first end 26a and the second end 26b of the bracket 26) to at least partially secure a handle 44 of a drill assembly 40 between the bracket 26 and the side plate 22. For example, as shown in FIGS. 5 and 6, a first bracket connector 28a may engage the first end 26a of the bracket 26 and a second bracket connector 28b may engage the second end 26b of the bracket 26, where such engagement engages the handle 44 of the drill assembly 40 to the side plate 22. Illustratively, the bracket connectors 28 may engage the bracket 26 in any releasable and/or adjustable manner. In one example, the bracket 26 may have threads at or near the bracket ends 26a, 26b that may engage threads of the bracket connectors 28 (e.g., nuts) in a releasable and/or adjustable manner. Alternatively, the bracket connectors 28 may engage the bracket 26 in a permanent manner.

The bracket connector(s) 28 may take on any shape and/or size. In one example, the bracket connector(s) 28 may have a grip portion 29, as shown in FIG. 6. Illustratively, the grip portion 29 of the bracket connector(s) 28 may be configured to allow a user to adjust and/or remove the bracket connectors 28 with respect to the bracket 26.

When the bracket 26 is connected to the side plate 22 and is engaging, or otherwise held in place with respect to the side plate 22, the handle 44 of the drill assembly 40 may be positioned such that the side plate 22 may prevent or at least substantially prevent movement of the drill assembly 40 in a direction of rotation of a portion of the drill assembly 40 configured to rotate an auger 60 or other feature. In one example, where the side plate 22 is positioned adjacent a left side of the handle 44, the side plate 22 may prevent rotational movement of the handle 44 in a clockwise direction of rotation in which a portion of the drill assembly 40 or feature attached to the drill assembly 40 is rotating. It is contemplated that the drill assembly attachment 10 may prevent and/or facilitate movement of the handle 44 of the drill assembly 40 in other directions and/or in other manners, as desired.

Figure 4:
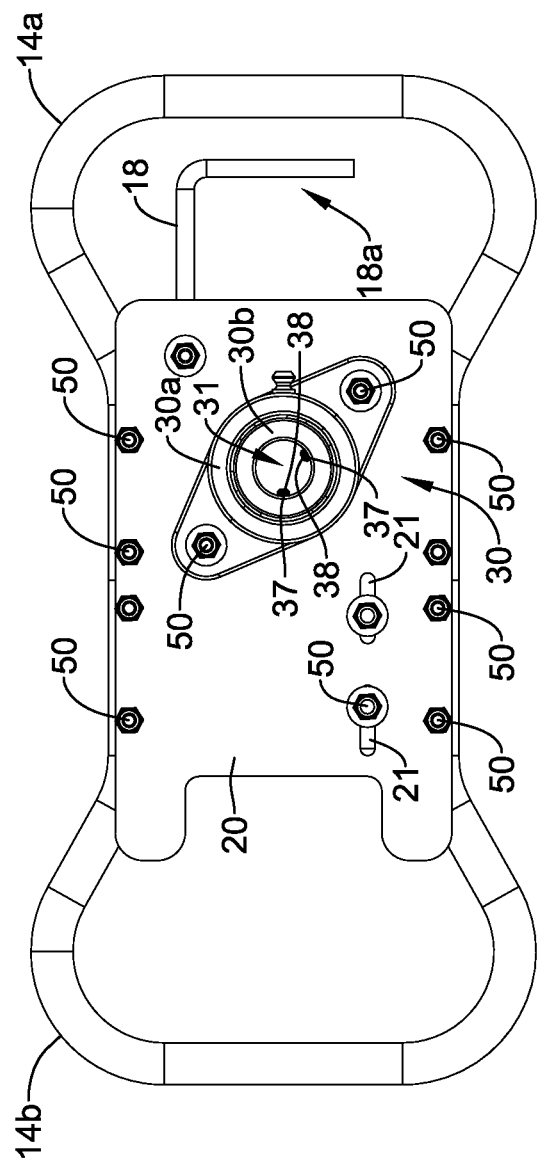
FIG. 4 is the schematic bottom view of an illustrative power drill attachment.

In some instances, the handle 14 may extend from the mounting member or drill mount 16. The handle 14 may extend substantially around the mounting member or drill mount 16, as shown in FIGS. 3-5. Alternatively, or in addition, as shown in FIGS. 1-11, the handle 14 may have a first handle portion 14a extending from a first end of the mounting member or drill mount 16 and a second handle portion 14b extending from a second end of the mounting member or drill mount 16 opposite the first end.

The handle 14 may be made from any material in any manner, as desired. For example, the handle 14 may be made from a metal, a polymer, a composite material, or other material capable of structurally withstanding forces from a user and/or drill assembly 40 while the user operates a drill assembly 40 with the drill assembly attachment 10 connected to the drill assembly 40.

The handle 14 may be connected to the mounting member or drill mount 16 in any manner. In one example, as shown in the Figures, the handle 14 may be connected to the mounting member or drill mount 16 (e.g., the base plate 20) with one or more assembly connectors 50 or other connection mechanism. Illustratively, the assembly connectors 50 may include a male threaded member capable of being inserted through the handle 14 and/or the base plate 20 to mate with a female threaded member adjacent or a part of one or more of the base plate 20 and handle 14. Alternatively, or in addition, the handle 14 may be connected to the mounting member or drill mount 16 with any known connection technique. For example, the handle 14 may be connected to the mounting member or drill mount 16 with a weld technique, a bonding technique, an adhesive technique, and/or any other connection technique, as desired.

In some instances, the throttle 18 of the drill assembly attachment 10 may be in adjustable communication with one or more of the mounting member or drill mount 16 and the handle 14 and may have a first portion 18a and a second portion 18b. Illustratively, a user engaging portion or the first portion 18*a* of the throttle 18 may be positioned or extend adjacent the handle 14 and may be engaged by a user (e.g., by a user's hand) and a trigger engaging portion or the second portion 18*b* may be positioned or extend adjacent the second portion 16*b* of the mounting member or drill mount 16 and may selectively engage the trigger 42 of the drill assembly 40 when the drill assembly is received in the drill assembly attachment 10. In one example, a user may grasp the handle 14 of the drill assembly attachment 10 with both hands and, with a hand adjacent the throttle 18, may engage the first portion 18*a* of the throttle 18 to selectively engage the trigger 42 of the drill assembly 40. Illustratively, the user may be able to grasp the handle(s) 14 of the drill assembly attachment 10, engage the first portion 18*a* of the throttle 18 to engage the trigger 42 of the drill assembly 40 and apply a force (e.g., in a downward direction toward a material, in an upward direction away from a material, and/or in a sideways direction) to the drill assembly attachment 10 to facilitate an attachment or auxiliary device (e.g., auger 60, or other attachment) penetrating or otherwise interact with a material or substance (e.g., ice, dirt, or other material).

The user engaging portion or first portion 18*a* of the throttle 18 may be in rotational communication with the trigger engaging portion or second portion 18*b*. In some instances, the user engaging portion or first portion 18*a* of the throttle 18 may be linearly or substantially linearly actuated or adjusted and in response to the linear or substantially linear actuation or adjustment of the user engaging portion or the first portion 18*a*, the trigger engaging portion or second portion 18*b* of the throttle 18 may be rotationally actuated or adjusted to engage the trigger 42 of the drill assembly 40. Substantially linearly actuating or adjusting the user engaging portion or the first portion 18*a* of the throttle 18 may be defined as adjusting the user engaging portion or the first portion 18*a* less than forty-five (45) degrees, less than thirty (30) degrees, less than fifteen (15) degrees, or less than five (5) degrees from an axis A (as shown in FIG. 3) of the throttle 18. Alternatively, or in addition, substantially linearly actuating or adjusting the user engaging portion or the first portion 18*a* of the throttle 18 may be defined as moving the first portion 18*a* in either direction that axis A extends more than in any other direction deviating from axis A. Other arrangements of the throttle 18 may be utilized, as desired, to engage the trigger 42 of the drill assembly 40. For example, in some embodiments the second portion 18*b* may engage the trigger 42 upon rotation of the first portion 18*a* relative to the handle 14.

The first portion 18*a* of the throttle 18 may take on any shape or size, as desired. For example, the first portion 18*a* of the throttle 18 may have an L-shape, as shown in FIGS. 3, 5, 9, and 10, or other shape that may allow a user to grasp an end or portion thereof and actuate or adjust the first portion 18*a* linearly.

As discussed, the throttle 18 may be in adjustable communication with one or more of the mounting member or drill mount 16 and the handle 14 of the drill assembly attachment 10. In some instances, a first portion 18*a* of the throttle 18 may be supported by one or more supports 52. Illustratively, the support 52 may extend from the mounting member or drill mount 16 and may be configured to support the throttle 18 a distance from the base plate 20 of the mounting member or drill mount 16. In one example, the support 52 may surround (e.g., entirely surround, substantially entirely surround or partially surround) a portion of the throttle 18 such that radial movement of the throttle 18 is limited. The support 52 may allow the throttle 18 to actuate or adjust axially (e.g., linearly), such that the throttle 18 may engage the trigger 42 of a received drill assembly 40. Although particular configurations of the throttle 18 with respect to the handle 14 and/or mounting member or drill mount 16 are discussed herein, other arrangements and/or configurations performing a similar function are contemplated.

The first portion 18*a* of the throttle 18 may communicate with the second portion 18*b* of the throttle 18 in any manner. For example, the first portion 18*a* and the second portion 18*b* of the throttle 18 may be unitarily formed or may connect with a first connector 54*a*, as shown in FIG. 3, (e.g., a screw and nut, any other male threaded member and female threaded member configured to receive the male threaded member, a bearing system, a rivet, or other connector feature) such that the first portion 18*a* and the second portion 18*b* may rotate with respect to one another about the first connector 54*a* or any other pivot point or axis. In some instances, the first portion 18*a* of the throttle 18 may connect with an extender 56 of the second portion 18*b* of the throttle 18 via the first connector 54*a*, where the first connector 54*a* facilitates the rotation between the first portion 18*a* and the second portion 18*b* of the throttle 18.

An actuation member 58 of the second portion 18*b* of the throttle 18 may be positioned with respect to the mounting member or drill mount 16 to engage the trigger 42 of a drill assembly 40 received in the mounting member or drill mount 16. The actuation member 58 may be a unitarily formed feature or comprise one or more permanently (as shown in FIG. 3, for example) or adjustably connected features. In instances where the actuation member 58 of the second portion 18*b* of the throttle 18 is distanced from the first portion 18*a* of the throttle 18, the actuation member 58 may be connected to the first portion 18*a* of the throttle 18 through the extender 56, the first connector 54*a*, and/or any other feature connecting or providing communication between the first portion 18*a* and the second portion 18*b* of the throttle 18. In some examples, the actuation member 58 may be permanently or adjustably connected to the extender 56 with a welding technique, a soldering technique, a fusion bonding technique, one or more connection members and/or one or more other connection techniques or connectors known in the art.

A second connector 54*b* (e.g., a screw and nut, any other male threaded member and female threaded member configured to receive the male threaded member, a bearing system, a rivet, or other connector feature) may connect the extender 56 and/or the actuation member 58 to the side plate 22 of the mounting member or drill mount 16 in any manner. For example, the second connector 54*b* may be inserted through the extender 56 and/or the actuator member 58 and into an opening 39 in the side plate 22. In some instances, the opening in the side plate 22 may be elongated and allow for the position of the actuation member 58 to be adjusted with respect to a distance between the actuation member 58 and the base plate 20.

In some instances, the drill assembly attachment 10 may include a bearing assembly 30, as shown in FIG. 4. The bearing assembly 30 may be positioned with respect to the base plate 20 such that it is capable of engaging the chuck 12 and may be connected to a drill assembly 40 when the chuck 12 is inserted into the drill assembly attachment 10. The bearing assembly, in some cases, may engage the chuck 12 with a bearing connector 37 that may be configured to allow a portion of the bearing assembly 30 to rotate with the chuck 12 when the chuck 12 is rotated by the drill assembly 40. In one example, the bearing connector 37 may include one or more set screws 38, as shown in FIG. 4. In other examples, the bearing connector 37 may be any other type of connector capable of creating an adjustable connection between the bearing assembly 30 and the chuck 12 and/or the drill assembly 40.

The bearing assembly 30 may have a first portion 30a and a second portion 30b. The first portion 30a of the bearing assembly 30 may be affixed or otherwise connected to the base plate 20 of the drill mount 16. The first portion 30a may be connected to the base plate 20 via assembly connectors 50, other connectors, and/or through any other connection technique. The assembly connectors 50 may include a threaded male member (e.g., a screw, a bolt, etc.) and a threaded female member (e.g., a nut) configured to receive the threaded male member. Alternatively, or in addition, the first portion 30a of the bearing assembly 30 may be unitarily formed with the base plate 20 or connected to the base plate 20 with a connection technique, such as a weld technique, a bonding technique, an adhesive technique, and/or other any other connection technique, as desired. The second portion 30b of the bearing assembly 30 may be connected to the first portion 30a through a bearing connection (not shown) and may be configured to rotate with respect to the first portion 30a.

The bearing assembly 30 may define an opening 31 that may be sized to receive the chuck 12 or other rotating feature (e.g., an auger 60) connected to or of the drill assembly 40. In one example, the second portion 30b of the bearing assembly 30 may be connected to the base plate 20 and may define or at least partially define the opening 31, wherein the opening 31 may be positioned coaxial or substantially coaxial with the opening 32 in the base plate 20.

As shown in FIG. 12, the drill assembly attachment 10 may be used in a method 100 of using a drill assembly 40 (or other drill assembly) and an auger 60. In one example, the method may use a drill assembly attachment 10 having the mounting member or drill mount 16, a handle 14 extending from the mounting member or drill mount 16, and the throttle 18 oriented to be actuatable or adjustable with respect to the mounting member or drill mount 16 and/or the handle 14. The method 100 may be used to drill a hole in ice for ice fishing purposes or other purposes, to drill a hole in dirt for gardening, post digging, or for other purposes, or to drill holes, move materials, stir materials, etc. for a variety of other purposes, as desired.

The method 100 may include inserting 102 a first portion 40a of the drill 40 into the opening 32 in the first portion 16a (e.g., in the base plate 20) of the mounting member or drill mount 16. In some instances, the step of inserting (102) a first portion 40a of the drill assembly 40 may include inserting a portion of the chuck 12 into and/or through the opening 32 in the first portion 16a of the mounting member or drill mount 16 such that the first portion 40a of the drill assembly 40 may not actually be inserted into the opening 32, or may include inserting any portion (e.g., a small portion, a large portion, or any other portion) of the first portion 40a of the drill assembly 40 may be inserted into the opening 32.

In the method 100, a second portion 40b (e.g., including the handle 44) of the drill assembly 40 may be connected (104) to a second portion 16b (e.g., the side plate 22) of the mounting member or drill mount 16. In one example, the second portion 40b of the drill assembly 40 may be connected (104) to the side plate 22 of the mounting member or drill mount 16 with a bracket 26 that may surround a portion of the second portion 40b (e.g., a portion of the handle 44) of the drill assembly 40 and engage the second portion 40b of the drill assembly 40. In some instances, the bracket 26 may be inserted through openings 36 in the side plate 22 and may engage the bracket connectors 28 to engage the second portion 40b of the drill assembly 40 between the bracket 26 and the side plate 22.

Figure 9:
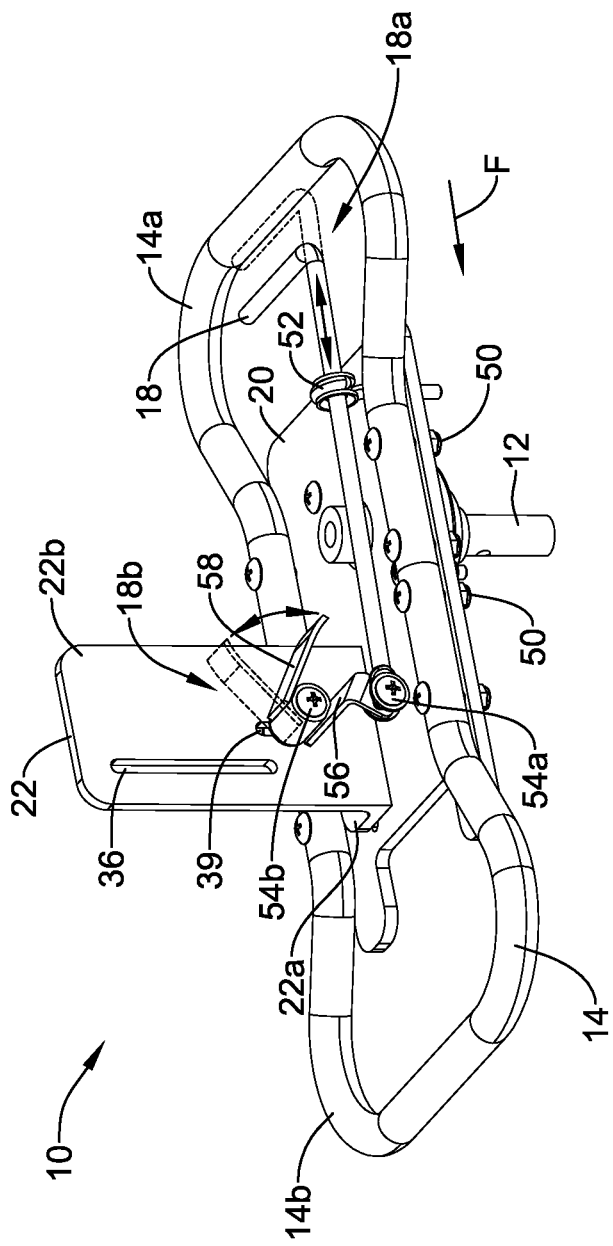
FIG. 9 is a schematic perspective view from above of an illustrative power drill attachment shown in an illustrative trigger engaging portion in a disengaged position.
Figure 10:
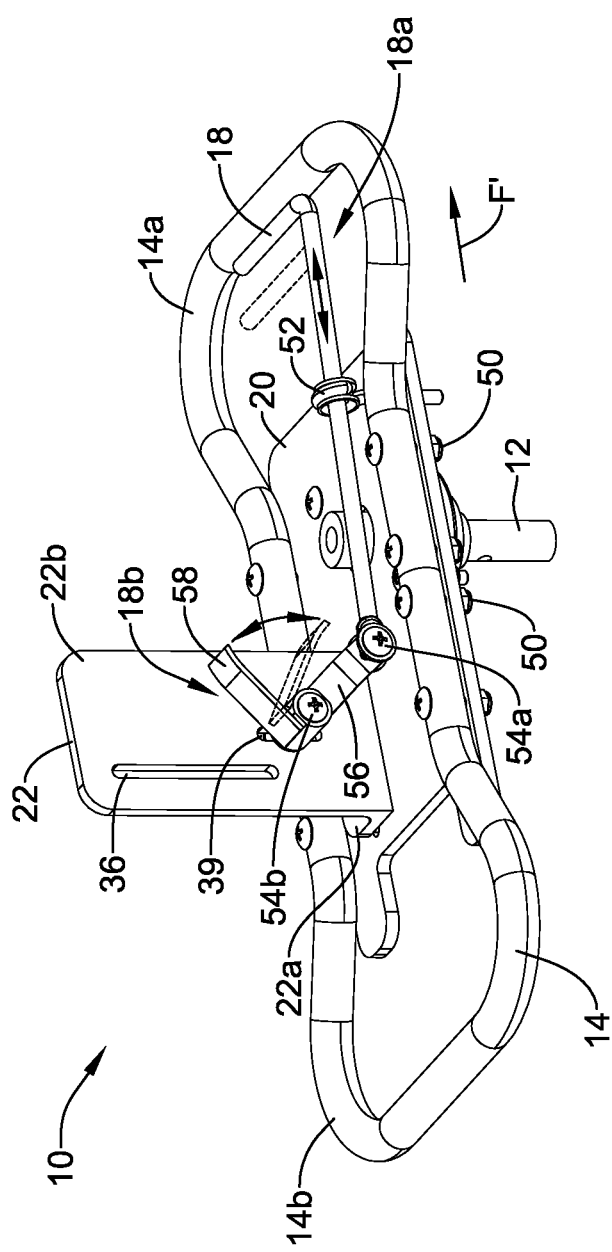
FIG. 10 is a schematic perspective view from above of an illustrative power drill attachment showing an illustrative trigger engaging portion in an engaged position.

In some instances, the method 100 may include engaging (106) the trigger 42 of the drill assembly 40 with the actuatable or adjustable throttle 18 of the drill assembly attachment 10. In one example, a user may apply a force to the first portion 18a of the throttle 18 to rotationally actuate or adjust the second portion 18b of the throttle 18, as shown in FIGS. 9 and 10, and when the drill assembly 40 is received in the drill assembly attachment 10, to selectively engage the trigger 42 of the drill assembly 40. Applying a force to the first portion 18a in a first direction (as represented by the arrow F) may position the actuation member 58 in a disengaged position from an engaged position (represented by dotted lines), as shown in FIG. 9, such that the actuation member 58 may be disengaged from the trigger 42 of the drill assembly 40 received in the drill assembly attachment 10. Removing the force in the first direction F and/or applying a force to the first portion 18a of the throttle 18 in a second direction (as represented by arrow F') opposite or substantially opposite the first direction F may position and/or move the actuation member 58 into an engaged position from a disengaged position (represented by dotted lines), as shown in FIG. 10, where the actuation member 58 may engage the trigger 42 of the drill assembly 40 received in the drill assembly attachment 10. In instances when the throttle 18 is under a bias force (e.g., a force caused by a spring or other force creating mechanism), the actuating member 58 and/or throttle 18 may be biased to the engaged or the disengaged position and the removal of a force in the F or F' direction may allow the actuating member 58 to revert to the position to which it is biased.

In an operative example, a user may grasp the first handle portion 14a of the drill assembly attachment 10 with a first hand and grasp the second handle portion 14b of the drill assembly attachment 10 with a second hand while continuing to grasp the first handle portion 14a. While grasping the handle 14 or other grasping mechanisms with one or more hands, a user may be able to apply a force on the first portion 18a of the throttle 18 to engage the trigger 42 with the second portion 18b of the throttle 18 and to rotate an auger 60 or other feature attached to the drill assembly 40. In some cases, while rotating the auger 60 or other feature attached to the drill assembly 40, a user may apply a force toward a ground surface or toward any other material to facilitate penetration of the ground surface or movement of the other material with the auger 60 or other feature. Such an arrangement may allow a user to drill a hole in and/or through a surface while securely maintaining the drill assembly 40 in a desired position.

Although method 100 may be depicted and/or described in a particular order, it is contemplated that steps of method 100 may be performed in other orders, as desired.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

The status of the claims:

1. A drill assembly attachment for connection to a power drill assembly having a handle and a trigger, the drill assembly attachment comprising:

a handle having two handle gripping portions being parallel and laterally spaced apart;

a drill mount connected to the handle and being located between the laterally spaced apart two handle gripping portions;

the drill mount further comprising a base plate positioned between and extending laterally toward the laterally spaced apart two handle gripping portions, and a power drill assembly handle connector;

the power drill assembly handle connector further comprising a side plate connected to and extending upward from the base plate and a bracket connected to the side plate;

the base plate having an opening spaced from the side plate and between the laterally spaced apart handle gripping portions;

a bearing assembly defining an opening and being connected to the base plate, with the opening in the bearing assembly being coaxially aligned with the opening in the base plate;

a throttle connected to the drill mount and having a first end, a second end, and an elongated portion extending between the first and second ends; and wherein the side plate and bracket of the power drill assembly handle connector are positioned to be connected to the handle of the power drill assembly when the power drill assembly is aligned with the opening in the bearing assembly and the opening in the base plate, the throttle first end is proximate one of the two handle gripping portions and the throttle second end is proximate the side plate and the trigger of the power drill assembly.

2. The drill assembly attachment of claim 1, wherein when the side plate and bracket of the power drill assembly handle connector are positioned to be connected to the handle of the power drill assembly, the side plate is positioned adjacent a side of the power drill assembly.

3. The drill assembly attachment of claim 1, further comprising:
a chuck that engages the bearing at the opening in the base plate and is rotatable relative to the base plate.

4. The drill assembly attachment of claim 1, wherein the side plate further comprises one or more openings that receive at least a portion of the bracket.

5. The drill assembly attachment of claim 4, wherein the bracket further comprises a first end and a second end, and the first end and the second end of the bracket are inserted into and vertically adjustable relative to one or more of the one or more openings of the side plate when the bracket connects the handle of the power drill assembly to the drill mount.

6. The drill assembly attachment of claim 1, wherein the side plate prevents movement of the handle of the power drill assembly when the power drill assembly is connected to the drill mount.

7. The drill assembly attachment of claim 1, wherein the throttle first end further comprises a user engaging portion; and
the throttle second end further comprises a power drill assembly trigger engaging portion.

8. The drill assembly attachment of claim 7, wherein the throttle first end is movable linearly; and
the second end is movable rotationally in response to linear movement of the first end.

9. The drill assembly attachment of claim 1, further comprising a chuck that is rotatable relative to the base plate and wherein the bearing assembly includes a radially extending set screw that axially connects the chuck to the bearing assembly.

10. A drill assembly attachment for connection to a power drill assembly having a handle and a trigger, the drill assembly attachment comprising:
a drill mount further comprising a base plate having an opening and a power drill assembly handle connector spaced from the opening;
a handle extending laterally from the drill mount and opening in opposed directions to two handle gripping portions that are parallel and spaced apart;
a throttle having a first end proximate and movable relative to one of the two handle gripping portions and a second end being movably connected to the drill mount; and
wherein the power drill assembly handle connector of the drill mount further comprises a side plate connected to and extending upward from the base plate and being positioned to be connected to the handle of the power drill assembly when the power drill assembly is coaxially aligned with the opening in the base plate, and the throttle second end is proximate the trigger of the power drill assembly.

11. The drill assembly attachment of claim 10, wherein linear actuation of the first end of the throttle moves the second end of the throttle.

12. The drill assembly attachment of claim 10, wherein the first end of the throttle extends adjacent the handle and the second end extends adjacent the drill mount.

13. The drill assembly attachment of claim 10, wherein the drill mount further comprises a bracket connected to the side plate.

14. A method of using a power drill assembly having a handle a trigger and an auger with a drill assembly attachment,
the drill assembly attachment comprising a drill mount that further comprises a base plate and a drill assembly handle connector, with the drill assembly handle connector including a side plate extending upward from a base plate and the base plate further having an opening spaced from the side plate, a handle extending laterally from the drill mount in opposed directions to two handle gripping portions that are parallel and spaced apart, and an actuatable throttle, the method comprising:
aligning the power drill assembly with the opening in the base plate of the drill mount of the drill assembly attachment;
connecting the handle of the power drill assembly to the side plate of the drill mount;
connecting the auger to the drill assembly attachment proximate the opening in the base plate;
grasping the two gripping portions of the handle of the drill assembly attachment; and
engaging a first end of the actuatable throttle proximate one of the two handle gripping portions wherein a second end of the actuatable throttle engages the trigger of the power drill assembly.

15. The method of claim 14, further comprising:
wherein connecting the handle of the power drill assembly to a side plate of the drill mount includes placing a bracket around at least a portion of the handle of the power drill assembly and connecting the bracket to the side plate of the drill mount of the drill assembly attachment.

16. The method of claim 14, further comprising: using a bearing assembly and a chuck to connect the auger to the drill assembly attachment at the opening in the base plate.

* * * * *